United States Patent
Suzuki

(10) Patent No.: US 9,425,597 B2
(45) Date of Patent: Aug. 23, 2016

(54) GROMMET

(71) Applicant: SUMITOMO WIRING SYSTEMS, LTD., Mie (JP)

(72) Inventor: Takashi Suzuki, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/666,970

(22) Filed: Mar. 24, 2015

(65) Prior Publication Data

US 2015/0288158 A1    Oct. 8, 2015

(30) Foreign Application Priority Data

Apr. 2, 2014 (JP) ................................. 2014-075927

(51) Int. Cl.
*H02G 3/22* (2006.01)
*B60R 16/02* (2006.01)

(52) U.S. Cl.
CPC ............. *H02G 3/22* (2013.01); *B60R 16/0222* (2013.01)

(58) Field of Classification Search
CPC .......... H02G 3/22; H02G 3/18; H02G 3/081; H02G 3/083; H02G 15/013; F16L 21/05; F16L 21/02; F16J 15/52; B60R 16/0222; H01B 17/303; H01B 17/26; H01B 17/583; H01B 17/56; H01B 17/58
USPC ...... 174/668, 153 G, 152 G, 659, 660, 65 G, 174/650, 151, 654; 277/603, 635, 630, 634, 277/637, 628, 590, 602, 626, 616, 615, 277/606; 16/2.2, 2.1, 2.3; 248/56; 439/567, 439/556, 559
See application file for complete search history.

(56) References Cited

U.S. PATENT DOCUMENTS

| | | | | |
|---|---|---|---|---|
| 4,928,349 A | * | 5/1990 | Oikawa | F16L 5/02 16/2.1 |
| 4,945,193 A | * | 7/1990 | Oikawa | H02G 3/0625 174/153 G |
| 5,138,117 A | * | 8/1992 | Oikawa | H02G 3/088 16/2.2 |
| 5,775,944 A | * | 7/1998 | Flask | H01R 13/743 439/556 |
| 6,240,597 B1 | * | 6/2001 | Mochizuki | B60R 16/0222 16/2.1 |
| 6,691,331 B2 | * | 2/2004 | Gallacher | E03D 11/16 277/606 |
| 7,915,534 B2 | * | 3/2011 | Uchibori | B60R 16/0222 16/2.1 |
| 2012/0146295 A1 | * | 6/2012 | Suzuki | H02G 3/22 277/606 |

FOREIGN PATENT DOCUMENTS

JP    5-91997    12/1993
JP    2012-130085    7/2012

* cited by examiner

*Primary Examiner* — Dimary Lopez Cruz
(74) *Attorney, Agent, or Firm* — Greenblum & Bernstein, P.L.C.

(57) ABSTRACT

A grommet body includes: a cylinder portion into which a wire harness is inserted; a first conical flange portion which extends onto an outer circumference of the cylinder portion, and is formed in a conical shape expanding toward a vehicle body panel; an annular seal lip which is formed in a shape protruding onto an outer circumferential edge portion of the first conical flange portion, the edge portion being on a surface opposing the vehicle body panel; and a second conical flange portion which extends from an outer circumferential end of the first conical flange portion, and is formed in the conical shape expanding toward the vehicle body panel at a conical angle smaller than the conical angle of the first conical flange portion.

7 Claims, 7 Drawing Sheets

PRIOR ART

PRIOR ART

PRIOR ART

GROMMET

CROSS-REFERENCE TO RELATED APPLICATIONS

The present application claims priority under 35 U.S.C. §119 of Japanese Application No. 2014-075927, filed on Apr. 2, 2014, the disclosure of which is expressly incorporated by reference herein in its entirety.

BACKGROUND OF THE INVENTION

1. Field of the Invention

The present invention relates to a grommet which is inserted into a through-hole having a burring of a vehicle body panel.

2. Description of Related Art

Generally, a vehicle body panel includes a through-hole which allows insertion of a wire harness, the panel dividing an engine compartment and an inner vehicle space. In such a case, an elastic member such as rubber, elastomer or the like (hereafter referred to as grommet) is fitted into the through-hole to secure a sufficient waterproofing condition between the through-hole and the wire harness. The grommet has a structure to secure a waterproof condition, including a grommet body and a resin inner mounted on the grommet body. The grommet provides protection for the wire harness and divides the interior and exterior sides of the vehicle body panel with respect to the through-hole (see Japanese Utility Patent Laid-open Publication H5-91997).

Normally, the through-hole formed on the vehicle body panel includes a through-hole formed simply by punching, in addition to a through-hole having a protruding burring, by bending an opening edge of the through-hole into one side. When the grommet is fitted into such a through-hole having a burring, the grommet is inserted from a side where the burring does not protrude therefrom, and a burring engagement piece formed on a tip of the resin inner is brought to engage with a tip of the burring (see Japanese Patent Laid-open Publication 2012-130085).

Specifically, as shown in FIG. 5, a grommet 100 is formed to have a grommet body 101 made of rubber or elastomer, which is assembled to a resin inner 102 made of a resin molding article. A wire harness 200 which is inserted into the grommet 100 is fixated to the grommet body 101 by an adhesive tape T, for example.

The grommet body 101 has a conically-protruding conical flange portion 103. The conical flange portion 103 includes a main body 103a and a tip portion 103b. The main body 103a expands at a predetermined inclined angle of $\theta 1$ from a horizontal position of the figure. The tip portion 103b has an inclined angle $\theta 2$ of substantially 90 degrees, which is bigger than the inclined angle $\theta 1$ ($\theta 2 > \theta 1$). On an inner surface side of the conical flange portion 103, a first seal lip 104 protrudes around the entire circumference near the boundary between the main body 103a and the tip portion 103b, and a second seal lip 105 protrudes around the entire circumference near an opening edge of the main body 103a.

The resin inner 102 includes a cylinder portion 106 into which the wire harness 200 is inserted, a burring engagement piece 107 for engaging with a burring B of a vehicle body panel P (discussed below) and being formed on one end of the cylinder portion 106, and a flange portion 108 that is formed on the other end of the cylinder portion 106 and is fitted with an inward opening engagement groove portion 101a, which is formed on the grommet body 101.

FIG. 6 is an enlarged view in cross-section of a main part which illustrates a state where the burring engagement piece 107 of the grommet 100 contacting the tip of the burring B of the vehicle body panel P. In this case, the grommet 100 is inserted into a through-hole H of the vehicle body panel P from a lower side as indicated in the figure, and after an opening edge of the conical flange portion 103 contacts a first surface of the vehicle body panel P, the conical flange portion 103 moves outward by additional insertion. More specifically, in a state where the inclined angle $\theta 1$ of the main body 103a and the inclined angle $\theta 2$ of the tip portion 103b are both smaller, the first seal lip 104 and the second seal lip 105 press firmly onto the first surface of the vehicle body panel P.

However, a worker operates with one hand inside a narrow work space of the engine compartment that is outside of the inner vehicle space, when the grommet 100, into which the wire harness 200 is inserted, is fitted onto the through-hole H having the burring B of the vehicle body panel P. In other words, the worker is forced to fit the grommet 100 into the through-hole H by touch without visual observation.

For this reason, a part of or the entire conical flange portion 103 sometimes becomes buckled down inwardly depending on an insertion angle or the like of the grommet 100 with respect to the through-hole H, when the grommet 100 contacts the first surface of the vehicle body panel P.

As shown in FIG. 7, for instance, the tip portion of 103b at the inclined angle $\theta 2$ contacts the first surface of the vehicle body panel P in a substantially vertical state, when the conical flange portion 103 comes to a close contact with the vehicle body panel P after the resin inner 102 is inserted into the through-hole H.

Because of this, in a situation when the worker performs insertion by touch with an improper insertion angle of the resin inner 102, the opening edge of the conical flange portion 103 becomes bent inwardly and the entire conical flange portion 103 becomes buckled down. Therefore, a proper contact pressure is not provided against the vehicle body panel P, as shown in FIG. 7. As a result, there was a circumstance where a sufficient waterproof condition is not provided between the engine compartment and the inner vehicle space.

SUMMARY OF THE INVENTION

The present invention has been conceived in view of the above-described circumstance, and provides a grommet to maintain a sufficient waterproof condition by easily securing a contacting state against a vehicle body panel when the grommet is inserted into a through-hole having a burring formed on the vehicle body panel.

The grommet according to the present invention includes a molded resin inner in a predetermined shape and a grommet body made of rubber or elastomer and covered with the resin inner. The grommet sheathes an exterior of the through-hole on a side without the burring with respect to a wire harness inserted into the through-hole with the burring on the vehicle body panel. The grommet is fitted in a waterproof condition, onto the through-hole with the burring in collaboration of the resin inner and the grommet body. The grommet body has a structure including a cylinder portion into which the wire harness is inserted on an opposing side of the burring on the vehicle body panel; a first conical flange portion which extends onto an outer circumference of the cylinder portion, and is formed in a conical shape expanding toward the vehicle body panel; a seal lip which is formed in an annular shape protruding onto an outer circumferential edge portion of the first conical flange portion, on a surface of the vehicle body panel side; and a second conical flange portion which extends from an outer circumferential end of the first conical flange portion, and is formed in the conical shape expanding toward the vehicle body panel at a conical angle smaller than the conical angle of the first conical flange portion.

With this structure, the grommet of the present invention secures a sufficient waterproofing condition when the grommet is fitted into the through-hole having the burring, since the second conical flange portion contacts the vehicle body panel in a lying position, acting as a guide which presses out the first conical flange portion and the second conical flange portion. When the resin inner is engaged with a protruding edge of the burring projecting to the second surface side of the vehicle body panel, from a peripheral edge of the through-hole, the second conical flange portion separates from the vehicle body panel and the seal lip is pressed onto a first surface side of the vehicle body panel.

The grommet according to the present invention has a structure in which a circumferential terminal edge portion of a protruding direction of the seal lip is substantially rectangular in cross-section.

With this structure, an adhesion between the circumferential terminal edge portion of the seal lip and the vehicle body panel increases, thereby securing an even more sufficient waterproof condition.

According to the present invention, it is possible to provide the grommet to maintain a sufficient waterproof condition by easily securing a contacting state against the vehicle body panel when the grommet is inserted into the through-hole having the burring formed on the vehicle body panel.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, a grommet according to an embodiment of the present invention is described with reference to the drawings.

Figure 1A:
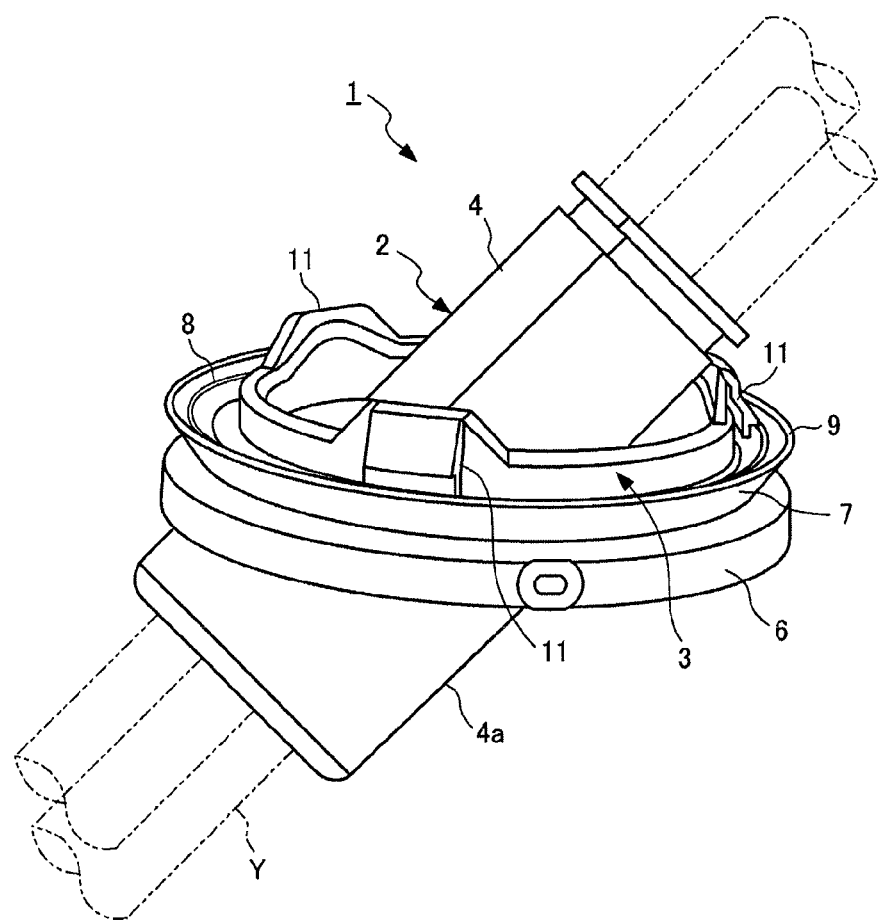
FIGS. 1A and 1B illustrate a grommet according to an embodiment of the present invention, FIG. 1A being a perspective view of the grommet, and FIG. 1B being a sectional view of a through-hole having a burring formed on a vehicle body panel.
Figure 1B:
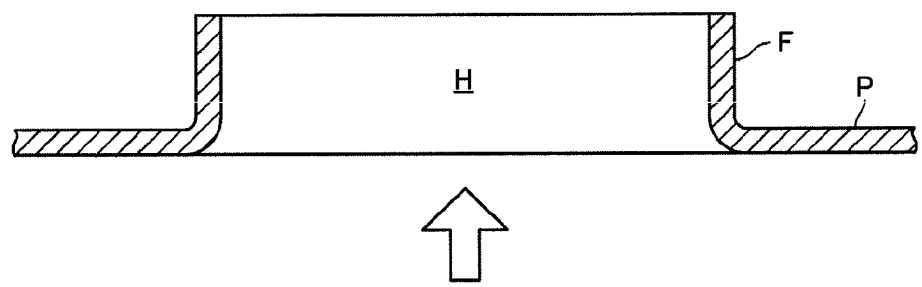

As shown in FIG. 1A, a grommet 1 according to the present embodiment includes a resin inner 3 molded in a predetermined shape and a grommet body 2 made of an elastic resin material and is covered with the resin inner 3. For instance, as shown with an arrow in FIG. 1B, the grommet 1 is inserted into a through-hole H, which is formed onto a vehicle body panel P so that a wire harness Y is inserted therethrough, the through-hole H having a burring F protruding on an opening edge thereof, the grommet 1 being inserted from a first side of the vehicle body panel P not having the burring F protruded therefrom.

The grommet 1 is structured to be fitted into the through-hole H having the burring F in a waterproof condition, with the resin inner 3 and the grommet body 2 working in collaboration, such that the grommet 1 is inserted into the through-hole H from the first side of the vehicle body panel P not having the burring F protruded therefrom, with respect to the wire harness Y which is inserted into the through-hole H having the burring F of the vehicle body panel P.

Figure 2:
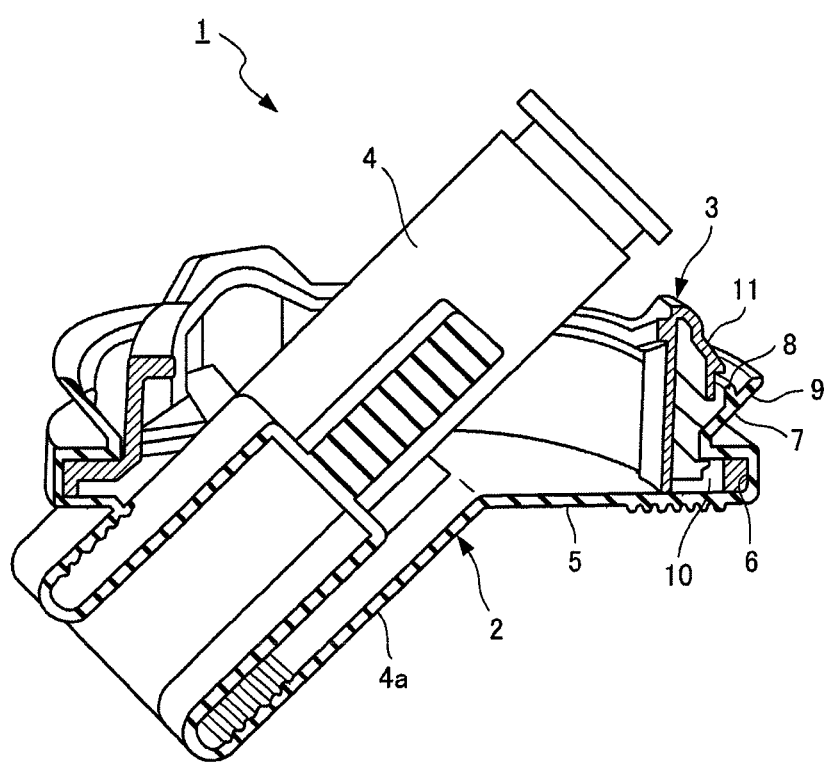
FIG. 2 is a sectional view of the grommet according to the embodiment of the present invention.
Figure 3A:
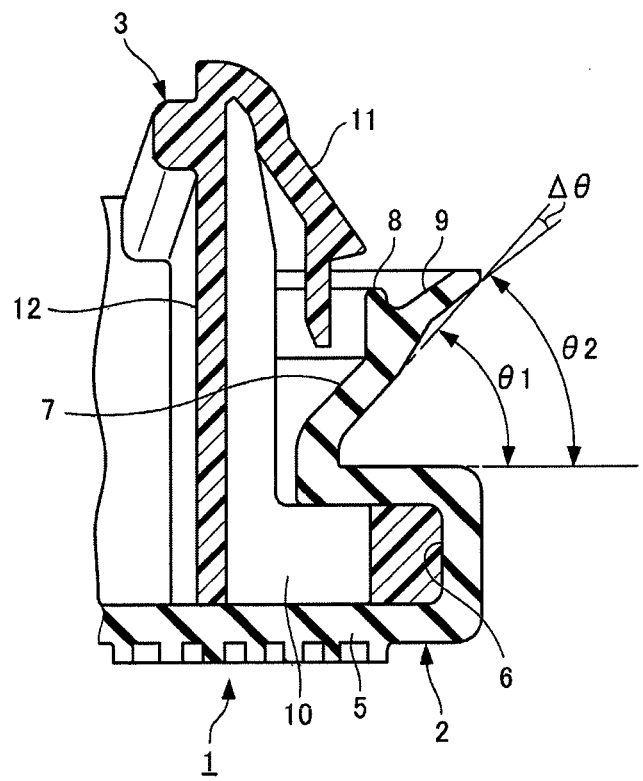
FIGS. 3A and 3B illustrate the grommet according to the embodiment of the present invention, FIG. 3A being a sectional view of a main part, and FIG. 3B being a sectional view illustrating a relationship between the vehicle body panel and a contacting surface.

As shown in FIGS. 2 and 3, the grommet body 2 is formed with the elastic resin material such as rubber, elastomer, or the like and integrally includes a cylinder portion 4 containing a flap twofold cylinder portion 4a, an enlarged diameter end surface portion 5, an engagement recess 6, a first conical flange portion 7, a seal lip 8, and a second conical flange portion 9.

As shown in FIG. 2, the cylinder portion 4 has the flap twofold cylinder portion 4a continue, at an outer tubular portion thereof, to the enlarged diameter end surface portion 5, thereby allowing insertion of the wire harness Y in a form of two bundles. The enlarged diameter end surface portion 5 is formed in a U-shaped cross-section so as to wrap an engagement flange 10 of the resin inner 3.

The engagement recess 6 is formed in an annular shape having a center on an axis line, which is orthogonal (hereafter referred to as orthogonal axis line) to the first surface of the vehicle body panel P as discussed below. The enlarged diameter end surface portion 5 has an axis line which is inclined (hereafter referred to as inclined axis line) with respect to the orthogonal axis line of the engagement recess 6. Furthermore, although the engagement recess 6 exhibits an annular semi-tubular shape having the center on the orthogonal axis line, the engagement recess 6 may have a semi-oval tubular shape, for instance, having a major axis in a direction along the inclined axis line.

The first conical flange portion 7, which extends onto an outer circumference of the cylinder portion 4, is formed in a conical shape expanding toward the vehicle body panel P.

Figure 3B:
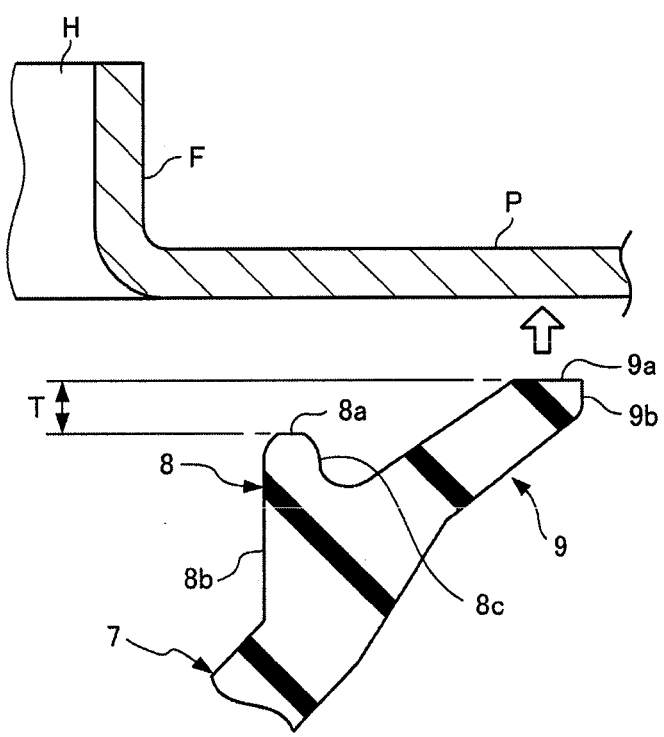

The seal lip 8 is formed in a shape protruding onto an outer circumferential edge portion of the first conical flange portion 7, the outer circumferential edge portion being opposed to a surface of the vehicle body panel P. The seal lip 8 is annularly formed around an entire circumference of the outer circumferential edge portion. A circumferential terminal edge portion of a protruding direction of the seal lip 8 is rectangular in cross-section. Further, as shown in FIG. 3B, a contact surface 8a is formed on the seal lip 8 so that the circumferential terminal edge portion of the protruding direction can be substantially rectangular in cross-section. Moreover, an interior circumferential wall 8b of the seal lip 8 is longer than an inner circumferential wall 8c along the orthogonal axis line, with a tip side wall being thicker than the wall on a base end side of the first conical flange portion 7. Therefore, the first conical flange portion 7, in view of the strength, deforms easily outward but unlikely to deform inward.

The second conical flange portion 9 extends from an outer circumferential end of the first conical flange portion 7, and is formed in the conical shape expanding toward the vehicle body panel P at a conical angle θ2, which is smaller only by Δθ than a conical angle θ1 of the first conical flange portion 7.

To illustrate in detail, as shown in FIG. 3B, a tip of the second conical flange portion 9 is formed so that a protrusion height along the orthogonal axis line direction is taller, only by a height T, than the tip of the seal lip 8. As shown in FIG. 3B, a protruded end of the second conical flange portion 9 is substantially rectangular in cross-section, having an orthogonal surface to the orthogonal axis line, more specifically, having a contact surface 9a located on the same surface as the first surface of the vehicle body panel P, based on a mounting position prior to fitting the grommet 1 onto the vehicle body panel. Also, a surface 9b of the tip portion which is adjacent to the contact surface 9a in an outer circumferential side is orthogonal to the contact surface 9a. By doing so, the tip of the second conical flange portion 9 is made likely to escape at least outward than inward with respect to a load in the direction along the orthogonal axis line.

The resin inner 3 integrally includes the engagement flange 10, on one end of the cylinder portion 4, the engagement flange 10 being inserted into the engagement recess 6 of the grommet body 2; a burring engagement piece 11 which protrudes from the other end of the cylinder portion 4; and a cylinder portion 12 into which the wire harness Y is inserted.

Next, in case of inserting the grommet 1 into the through-hole H having the burring F of the vehicle body panel P, the operations of the first conical flange portion 7, the seal lip 8, and the second conical flange portion 9 are described. A worker inserts, from an engine compartment side, the grommet 1 by touch into the through-hole H starting from the resin inner 3, from a state where the resin inner 3 and the grommet body 2 are assembled.

Figure 4A:
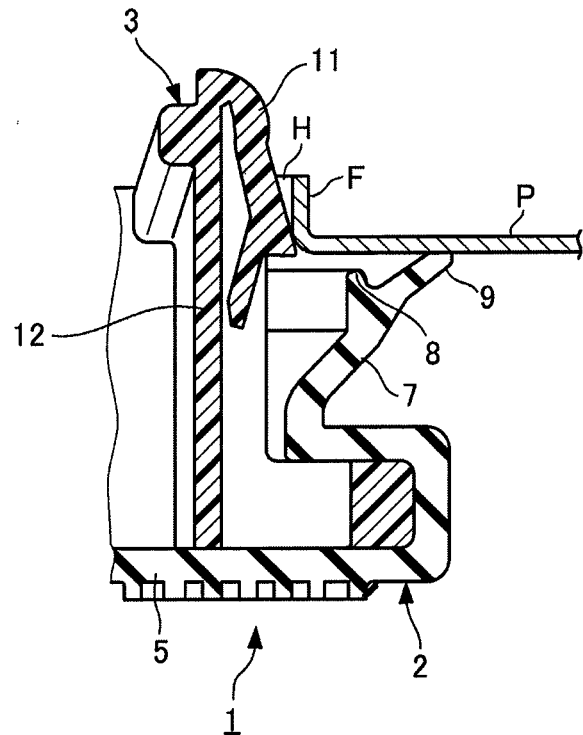
FIGS. 4A and 4B illustrate the grommet according to the embodiment of the present invention, FIG. 4A being a sectional view of the main part immediately after the grommet is inserted into the through-hole, and FIG. 4B being a sectional view of the main part in a state when the grommet is fitted into the through-hole.

As shown in FIG. 4A, when the grommet body 2 approaches to the vehicle body panel P, the tip of the second conical flange portion 9 which is higher only by the height T first contacts the first surface of the vehicle body panel P prior to the seal lip 8. The worker, from this state, moves the grommet 1 toward an upper right direction of the figure, in order to engage the burring engagement piece 11 of the resin inner 3 with the burring F of the vehicle body panel P.

As shown in FIG. 4A, an angle between the second conical flange portion 9 of the grommet body 2 and the front surface of the vehicle body panel P is smaller than 90 degrees (approximately 40 degrees in the figure). Furthermore, the conical angle θ2 of the second conical flange portion 9 is smaller than the conical angle θ1 of the first conical flange portion 7. Therefore, when the grommet body 2 moves toward the upper right direction of the figure, the grommet body 2 deforms in a direction where the conical angle of the second conical flange portion 9 becomes smaller, and the second conical flange portion 9 slides along the surface of the vehicle body panel P toward a right direction of the figure.

Figure 4B:
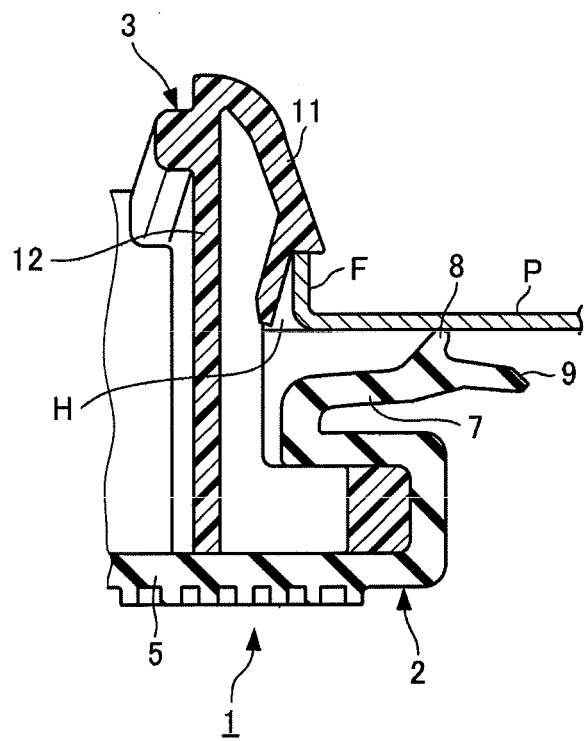
Figure 5:
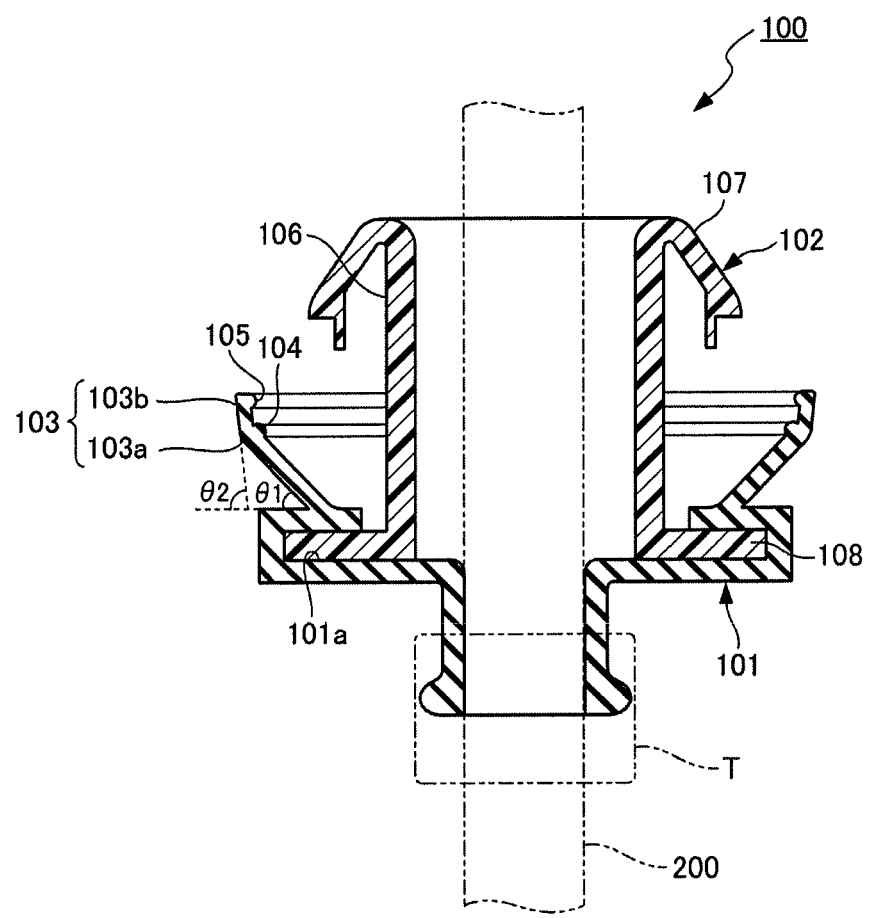
FIG. 5 is a sectional view of a conventional grommet.
Figure 6:
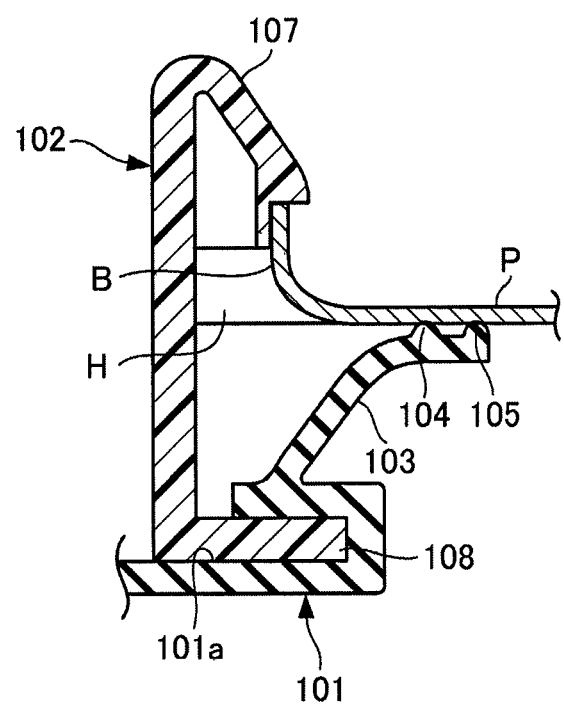
FIG. 6 is a sectional view of a state when the conventional grommet is properly in contact with the vehicle body panel.
Figure 7:
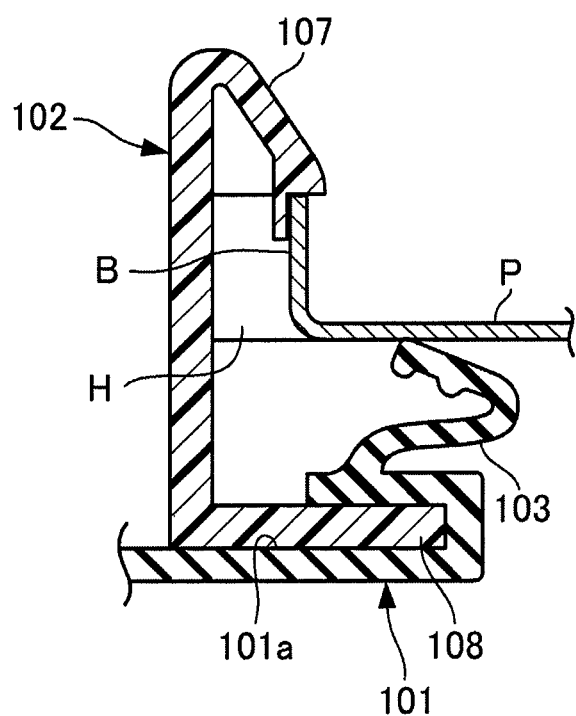
FIG. 7 is a sectional view of a state when the conventional grommet is buckled down inwardly, and is in contact with the vehicle body panel.

In addition, as shown FIG. 4B, when the grommet body 2 is inserted into the through-hole H along the orthogonal axis line, the burring engagement piece 11 snap-engages to the burring F, thereby fitting the grommet 1 into the through-hole H.

In this process, as shown in FIG. 4B, both the first conical flange portion 7 and the second conical flange portion 9 are pressed out even more outward from the state shown in FIG. 4A, having the seal lip 8, which acts as a main seal, pressing firmly to the first surface of the vehicle body panel P.

In other words, the second conical flange portion 9 acts as a pressing-out guide so that the conical angle becomes smaller by contacting the first surface of the vehicle body panel P prior to the first conical flange portion 7, when the grommet body 2 is fitted and attached onto the through-hole H having the burring F. In addition, the second conical flange portion 9 separates from the vehicle body panel P in a state where the seal lip 8 is firmly pressed and fitted onto the first surface of the vehicle body panel P.

Therefore, when the grommet 1 is fitted into the through-hole H having the burring, it becomes possible to secure a sufficient waterproofing condition, since the second conical flange portion 9 contacts the vehicle body panel P in a lying position, acting as a guide which presses out the first conical flange portion 7 and the second conical flange portion 9. When a resin inner 11 engages with a protruding edge of the burring F projecting to the second surface side of the vehicle body panel P from a peripheral edge of the through-hole H, the second conical flange portion 9 separates from the vehicle body panel P and the seal lip 8 is pressed onto the first surface side of the vehicle body panel P.

As described above, the grommet according to the present invention is useful for overall grommet purposes, easily securing a contact condition against the vehicle body panel when the grommet is mounted onto the through-hole having the burring formed on the vehicle body panel, thereby maintaining a sufficient waterproofing condition.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A grommet including a resin inner molded in a predetermined shape and a grommet body made of an elastic resin material and covered with the resin inner, the grommet configured to be inserted into a through-hole having a burring formed on a vehicle body panel so that a wire harness is inserted therethrough, the grommet configured to be inserted from a first surface side of the vehicle body panel from which the burring does not protrude, and the grommet configured to be fitted in a waterproof condition to the through-hole with the resin inner and the grommet body working in collaboration, the grommet body comprising:

a cylinder portion into which the wire harness is inserted;

a first conical flange portion extending from an outer circumference of the cylinder portion, and formed in a conical shape expanding toward the vehicle body panel, an annular seal lip formed in a shape protruding from an outer circumferential edge portion of the first conical flange portion, the outer circumferential edge portion being on a surface opposing the vehicle body panel; and a second conical flange portion extending from an outer circumferential end of the first conical flange portion, and formed in a conical shape expanding toward the vehicle body panel at a conical angle smaller than a conical angle of the first conical flange portion.

2. The grommet according to claim 1, wherein a tip of the second conical flange portion is higher than a protrusion height of a tip of the seal lip.

3. The grommet according to claim 1, wherein the seal lip is a main seal that presses firmly against the first surface of the vehicle body panel.

4. The grommet according to claim 1, wherein the second conical flange portion is a guide pressing out the first conical flange portion when contacting the first surface of the vehicle body panel.

5. The grommet according to claim 1, wherein the second conical flange portion presses out so that the conical angle of the second conical flange portion becomes smaller by contacting the vehicle body panel prior to the seal lip, when the grommet body is fitted and attached onto the through-hole, and the second conical flange portion separates from the vehicle body panel in a fitted state where the seal lip is firmly pressed against the vehicle body panel.

6. The grommet according to claim 1, wherein the seal lip has a circumferential terminal edge portion formed in a substantially rectangular shape, in a protruding direction, in cross-section.

7. The grommet according to claim 1, wherein the seal lip connects the outer circumferential edge portion of the first conical flange portion to a proximal outer circumferential edge portion of the second conical flange portion.

* * * * *